US005176842A

United States Patent [19]

Kuwazawa et al.

[11] Patent Number: 5,176,842

[45] Date of Patent: Jan. 5, 1993

[54] METHOD OF MANUFACTURING A RESIN BOUND MAGNET

[75] Inventors: Takafumi Kuwazawa; Shigeru Nishida, both of Nagano, Japan

[73] Assignee: Sankyo Seiki Mfg., Co., Ltd., Nagano, Japan

[21] Appl. No.: 635,270

[22] Filed: Dec. 28, 1990

[30] Foreign Application Priority Data

Dec. 28, 1989 [JP] Japan ................................ 1-342994

[51] Int. Cl.[5] ............................................. C08B 35/04

[52] U.S. Cl. .............................. 252/62.54; 252/62.51; 523/445; 523/458; 428/900

[58] Field of Search .................... 252/62.54; 523/445, 523/458; 428/900

[56] References Cited

U.S. PATENT DOCUMENTS 3,371,044 2/1968 Cochardt ......................... 252/62.54
3,585,141 6/1971 Ingersoll .......................... 252/62.54
4,689,163 8/1987 Yamashita ........................ 252/62.54
4,878,978 11/1989 Goel ................................ 252/62.54
4,981,635 1/1991 Yamashitaa ...................... 252/62.54
5,096,741 3/1992 Kobayashi .......................... 427/127
5,128,215 7/1992 Pendergrass ..................... 252/62.54

FOREIGN PATENT DOCUMENTS 50-5899 1/1975 Japan .
63-284808 11/1988 Japan .
1114006 5/1989 Japan .

*Primary Examiner*—Prince Willis, Jr.
*Assistant Examiner*—Thomas Steinberg
*Attorney, Agent, or Firm*—McAulay Fisher Nissen Goldberg & Kiel

[57] ABSTRACT

A method of manufacturing a resin bound magnet comprising, mixing and kneading a powdered magnetic material and a rubber modified epoxy resin obtained from the addition polymerization of an epoxy resin and a butadiene or nitrile rubber and thereafter molding and setting the kneading mixture into a desired shape. The magnets prepared by the present invention exhibit permanent deformation under low compressive force, are soft and heat resistant and yet highly elastic and possess low dynamic exothermic properties and excellent low temperature characteristics. In addition, the inventive magnets exhibit excellent radial compression strength and other mechanical properties.

10 Claims, 1 Drawing Sheet

METHOD OF MANUFACTURING A RESIN BOUND MAGNET

BACKGROUND OF THE INVENTION

1. Field of the Invention

This invention relates to a method for manufacturing a resin bound magnet. More particularly, it relates to a method for manufacturing a resin bound magnet having excellent strength and magnetic characteristics, and magnets produced therefrom.

2. Description of the Prior Art

In recent years, in response to an increasing demand for powerful and miniaturized magnets to be used for electric motors, a variety of resin bound magnets obtained using rare earth and transition metals having excellent magnetic characteristics have been proposed.

A resin bound magnet is normally composed of a powdered magnetic material and a binder resin material for binding the fine particles of the magnetic material. The powdered magnetic material is typically a combination of rare earth and transition metals, such as, samarium and cobalt (Sm-Co), or of neodymium, iron and boron (Nd-Fe-B), while the binder resin material is normally a solid epoxy resin (see Japanese Patent Publications, Tokkai Hei No. 1-114006 and No. 2-6573).

When a solid epoxy resin is used as binder, the resin bound magnet is typically prepared in the following manner. The solid epoxy resin is first heated and then dissolved in an organic solvent, such as, acetone containing a hardening agent. The powdered magnetic material is then added to this solution. Thereafter, the solution is mixed well and kneaded while dry nitrogen gas is blown into the solution to vaporize the solvent. The residue is then dried by using a vacuum dryer and the dried blocks of the compound are pulverized to powder form. The powder is passed through a sieve to produce particles with a substantially uniform granule size, which are then filled into a metal mold for compression molding. The molded body is then subjected to treatment to eliminate any powdery residue, heat-set the resin and other conventional supplementary treatments.

While a rare earth/transition metal type resin bound magnet prepared according to the above known method exhibits excellent magnetic characteristics, allows a number of poles to be formed, is easily worked by machine tools and can have a desired configuration, it is accompanied by the following problems due to the solid epoxy resin binder.

Firstly, since the solid epoxy resin is relatively insoluble in organic solvents at ambient temperature, it must be heated to accelerate its dissolution.

Secondly, because residual organic solvent in the resultant compound produces significant adverse effects on the radial compression strength of the compound after molding, the amount of the organic solvent in the compound must be rigorously minimized by allowing the powdered compound to remain under vacuum for 24 hours after a vacuum drying of 2 hours.

In addition, the amount of the powdered compound introduced into the compression metal mold can fluctuate depending on the solvent content of the compound. This results in inaccuracies in the amount of material introduced into the mold as well as the density and strength of the product. These problems, in turn, hinder the preparation of a resin bound magnet having a relatively large diameter, reduced thickness, or length, wherein the powdered compound must be very evenly filled with the mold. Moreover, since the prior art resin bound magnets did not exhibit sufficient radial compression strength, they could not be press fit into a rotor. Consequently, the magnets needed to be fitted to the rotor by using an adhesive agent. This resulted in reduced efficiency and increased costs.

SUMMARY OF THE INVENTION

We have discovered a method for manufacturing a resin bound magnet which possesses improved radial compression strength and mechanical properties as compared with the prior art resin bound magnets. The invention is achieved by mixing and kneading a powdered magnetic material with a rubber modified epoxy resin obtained from the addition polymerization of an epoxy resin and a butadiene rubber or a nitrile rubber and thereafter, molding and setting the kneaded mixture into the desired shape. The amount of the rubber component in the inventive modified epoxy resin should be from about 5.0 to 30 weight percent to provide a resin having the properties desired to produce the results of the present invention.

Rubber modified epoxy resins prepared through addition polymerization of an epoxy resin and a butadiene rubber or a nitrile rubber exhibit a permanent deformation under a low pressure force, are soft and heat-resistive, yet are highly elastic, possess low dynamic exothermic properties and excellent low-temperature characteristics. As a result, the inventive resin bound magnets exhibit excellent radial compression strength and mechanical properties. In addition, neither rigorous control of the organic solvent nor a vacuum drying process are required. Consequently, the inventive compound of the magnetic material and the rubber modified epoxy resin is highly workable.

DETAILED DESCRIPTION OF THE INVENTION

The powdered magnetic material of the invention may contain a powdered compound of a rare earth metal, iron and boron, such as, Nd-Fe-B as its principle ingredient. Alternatively, a powdered compound of a rare earth metal and cobalt, such as, Sm-Co, may be used. Still alternatively, the rare earth component of the compound may be a mixture of rare earth elements selected from the group consisting of light rare earth elements and heavy rare earth elements, e.g., La through Lu (atomic numbers 57 through 71), Sc and yttrium (Y). Preferably, the powdered compound contains at least one light rare earth element, such as, neodymium (Nd) or praseodymium (Pr) that is readily available at a relatively low cost. The content of rare earth elements in the compound is preferably between about 12 and 20 atom percent.

The iron (Fe) content of the powdered magnetic material is preferably between about 65 and 82 atom percent, whereas the boron (B) content is advantageously between about 4 and 24 atom percent.

The powdered magnetic material is typically a rare earth element-iron-boron compound which is expressed by the formula:

$$Nd_x(Fe_{1-y}B_y)_{1-x}$$

where $X=0.14$ to $0.40$ and $Y=0.05$ to $0.2$.

Preferably, the powdered magnetic material has a particle size distribution such that about 0.1 wt. percent or less has a size equal to or greater than about 420 μm, and no more than about 15 wt. % have a particle size equal to or less than about 44 μm. This facilitates mixing the compound with a binder resin material at a high concentration.

The particles of the powdered magnetic material are preferably coated with a rust-preventive agent before mixing and kneading with the binder resin material, since the powdered magnetic material containing rare earth elements, iron and boron, is easily oxidized and has poor corrosion-resistance. Such a surface treatment can significantly improve the corrosion-resistance of the powder and make the process of rust-prevention after molding less troublesome.

While the rust-prevention treatment is optional, the coating process using a triazine derivative, e.g., dibutylamino-triazine-dithiol, as disclosed in Japanese Patent Publication Tokkai Hei No. 1-114006 by the applicant of the present invention, may be advantageously used.

When the powdered magnetic material is subjected to such a surface treatment process, each of the atoms of the heavy metals, i.e., Fe, Nd, of the magnetic material are adsorption-bonded with the dithiol group of the triazine derivative so that the particle is coated with an organic material which is highly rust-preventive. Moreover, the effect of the bridge formation carried by the organic compound and the binder resin, can contribute to improvement in the mechanical strength of the molded body.

Figure 2:
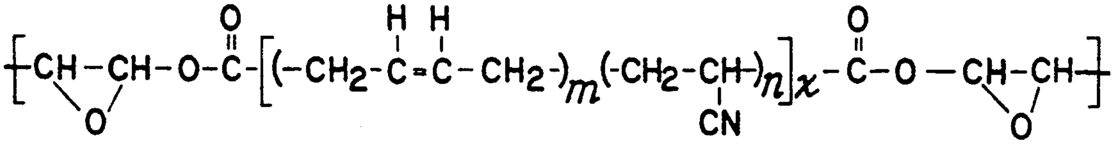
FIG. 2 is a structural formula of the rubbery portion of a modified epoxy resin suitable for use as a binder in the present invention.

A binder resin which can be used in the present invention is the rubber modified epoxy resin wherein the rubbery portion has the structural formula as shown in FIG. 2 wherein m is from 1 to 3, n is 1 to 3, and x is from 1 to 8, prepared by addition polymerization of an epoxy resin and a butadiene rubber or a nitrile rubber.

Figure 1:
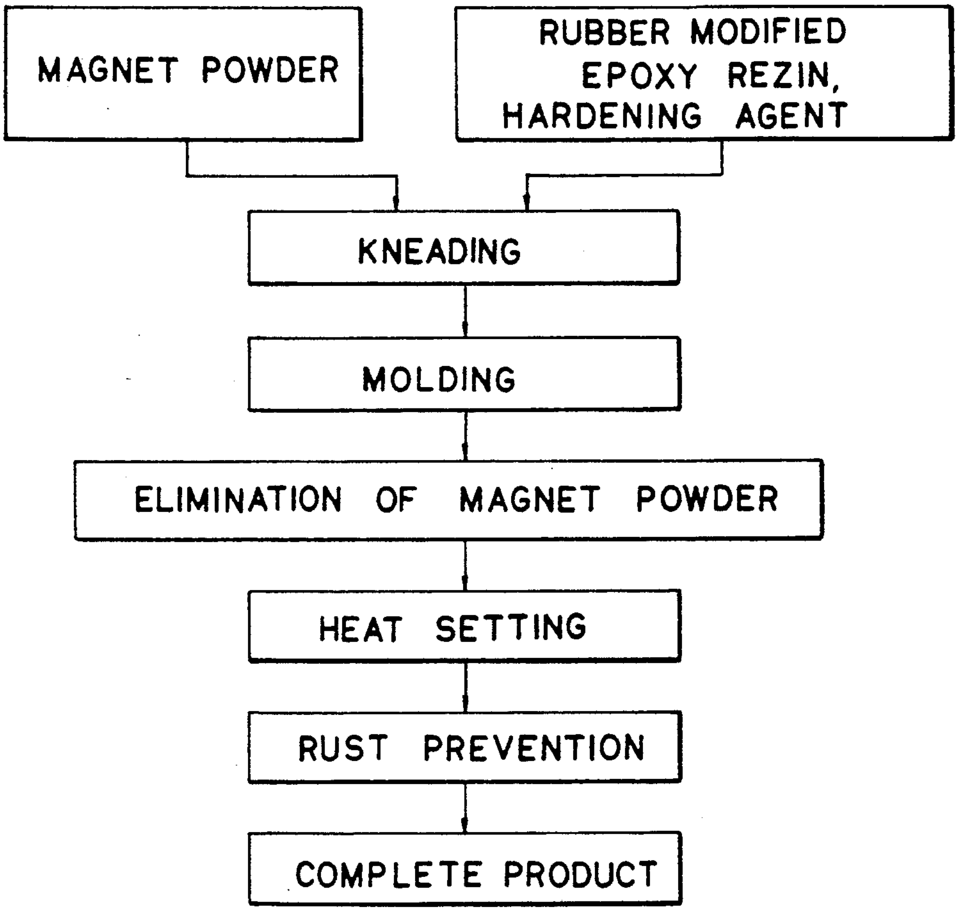
FIG. 1 is a schematic flow chart of the method of the invention.

Another binder resin suitable for use in the present invention has the structural formula:

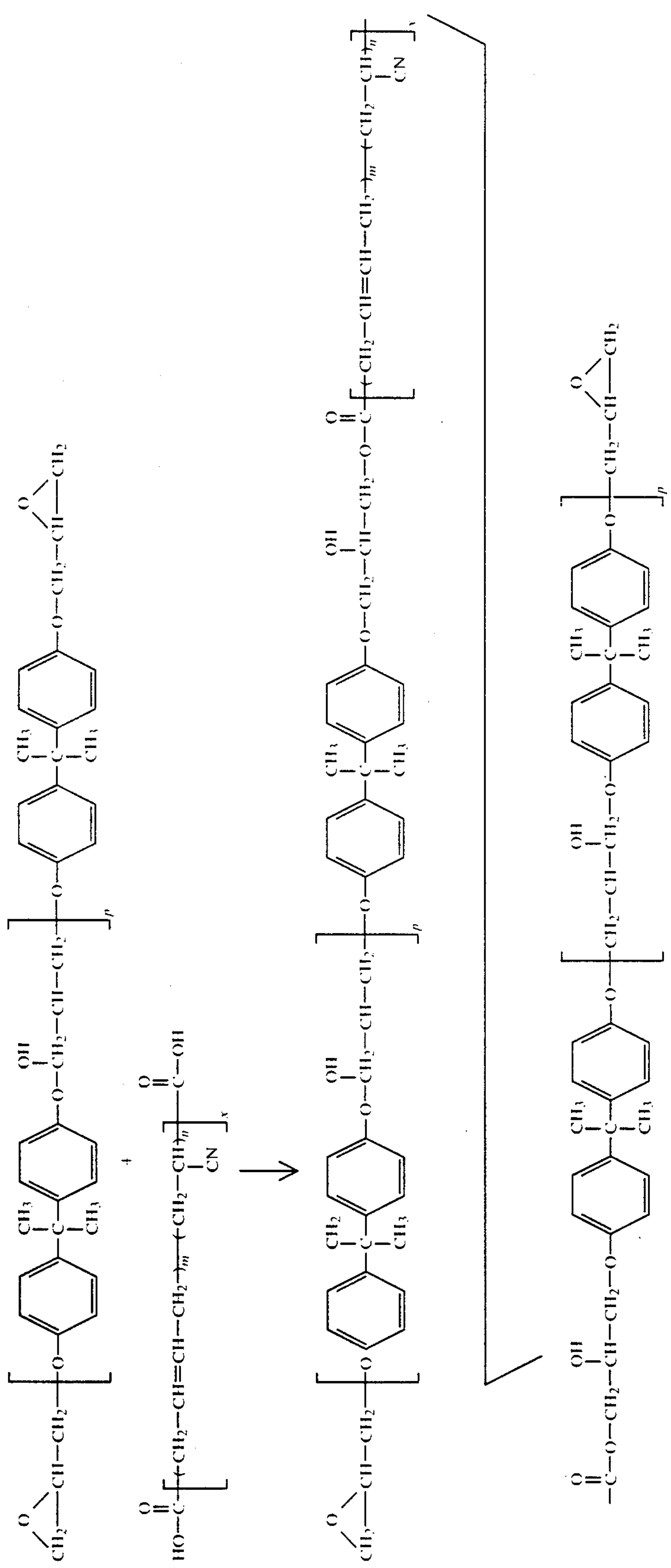

wherein p is 1 to 3, x is 1 to 8, m is 1 to 3 and n is 1 to 3,

A preferred process for carrying out the method of manufacturing the inventive magnet from a powdered magnetic material (or a powdered magnetic material that has been subjected to a corrosion resistent treatment) and a rubber modified epoxy resin as binder, will be described by referring to FIG. 1.

(1) Kneading

Kneading as used herein includes conditioning, mixing and physically kneading the powdered magnetic material and a binder resin to prepare the material to be molded for a permanent magnet.

In this step, the magnetic powder is coated with a rubber modified epoxy resin prepared by the addition polymerization of an epi-bis type epoxy resin and a butadiene rubber or a nitrile rubber having a rubber content between about 5 and 30 wt. %, and preferably, about 20 wt. %. We have found that when the rubber content of the polymer is less than about 5 wt. % or more than about 30 wt. %, the desirable properties of the resin deteriorate to a level such that the purposes of the invention are not achieved. The amount of binder resin is from 2 to 4 wt. % based on the weight of the magnetic material.

The modified epoxy resin is mixed with a hardening agent and the mixture is dissolved in an organic solvent, e.g., acetone or methyl ethyl ketone, in which it is soluble. The magnetic powder is admixed and kneaded with the solution and the solvent is removed, thereby coating the particles with the binder resin.

More specifically, for preparation of the powdered compound, the binder resin is dissolved in acetone in a non-magnetic mortar and the powdered magnetic material is added to the solution. The mixture is kneaded with a spatula while dry nitrogen gas ($N_2$) is blown into the solvent to prevent oxidation of the powdered magnetic material and to accelerate evaporation of the solvent. Alternatively, a screw, or a floating or soft-mixing apparatus may be used for kneading.

The product obtained from the kneading step is then pulverized in a non-magnetic mortar and passed through a 60-mesh sieve to obtain a powdered compound with even sized particles. Then, a lubricant may be admixed with the sieved powdered compound. Suitable lubricants mixture include calcium stearate, zinc stearate, molybdenum and the like. The amount of lubricant is generally from about 0.01 to 0.5 wt. %. The mixture is then introduced into a metal mold to form a compression molded compound as described below.

(2) Molding

The mixture of the sieved compound and calcium stearate is introduced into a compression mold and subjected to a pressure of about 9 ton/$cm^2$ to obtain a ring-shaped or tablet-shaped compression-molded and resin-bound body.

(3) Elimination of Magnet Powder

Any unbound magnetic powder left on the surface of the compression molded and resin bound body is removed by means of vacumming.

(4) Heat Setting

The molded body is subjected to a heat treatment at 200° C. for approximately 20 minutes for heat setting and to obtain a resin bound magnet.

(5) Rust-Prevention

The prepared resin bound magnet may then subjected to a rust-prevention process using known spraying and electrodeposition, or immersion techniques to produce a finished product. The rust-prevention process may be omitted if the powdered magnetic material has been subjected to a coating process using a triazine derivative as described earlier. However, it is advisable that the resin bound magnet be further subjected to a triazine treatment for the protection of particles whose coating might have been destroyed during the molding process.

This second triazine treatment process uses a triazine derivative similar to or the same as that described above to coat the molded magnet. The operation of coating the molded magnet with an organic material may be conducted by means of immersion, electrodeposition, or spray techniques.

Because the inventive resin bound magnet prepared by the above process contains a highly rigid hard segment in which the molecules are firmly bound together and a soft segment constituted by a highly elastic rubber content, it exhibits a permanent deformation under a low compressive force and is soft and heat-resistive. Yet, the inventive magnet is highly elastic, and possesses a low dynamic exothermic property and excellent low-temperature characteristics. Moreover, the inventive resin bound magnet exhibits excellent radial compression strength and other mechanical properties.

When acetone is used as solvent for the rubber modified epoxy resin at the time of kneading, the kneaded compound can be easily reduced to powder because the rubber modified epoxy resin is essentially unaffected by the acetone in the compound. The compound does not need to be vacuum dried to remove the acetone.

The Table below shows some of the binding characteristics of an epi-bis type epoxy resin containing a rubber modified epoxy resin in varying amounts as well as those of a conventional currently available epoxy resin.

TABLE

| | Amount of rubber in polymer in rubber modified epoxy resin (wt. %) | | | | | | | conventional unmodified |
|---|---|---|---|---|---|---|---|---|
| | 0 | 10 | 20 | 30 | 40 | 60 | 80 | epoxy resin |
| radial compression strength (kg/$mm^2$) | 4.5 | 5.0 | 6.3 | 6.5 | 7.1 | 7.1 | 6.7 | 4.0 |
| specific gravity (g/$cm^3$) | 5.6 | 5.5 | 5.43 | 5.53 | 5.62 | 5.77 | 5.74 | 5.6 |
| amount filled into mold (g) | 3.3 | 3.3 | 3.3 | 3.0 | 2.5 | 1.8 | 2.3 | 2.6 |
| fluidity (sec) | 1.3 | 1.3 | 1.3 | 2.1 | ∞ | ∞ | ∞ | 1.5 |
| (BH)max (MGOe) | 8.4 | 8.5 | 8.5 | 8.4 | 8.4 | 8.4 | 8.4 | |
| overall | good | excellent | excellent | good | no | no | no | good |

TABLE-continued

| Amount of rubber in polymer in rubber modified epoxy resin (wt. %) | | | | | | | conventional unmodified epoxy resin |
|---|---|---|---|---|---|---|---|
| 0 | 10 | 20 | 30 | 40 | 60 | 80 | |
| | | | | good | good | good | |

Those materials with a fluidity of ∞ cannot be put into a mold for compression molding.

As is apparent from the Table, when a rubber modified epoxy resin is used as the binder resin, the radial compression strength of the final product is remarkably improved without adversely affecting the magnetic characteristics (particularly (BH)max). The binder shows a maximum effect when its rubber modified epoxy resin content is 20 wt. %.

Therefore, when a resin bound magnet prepared by the method of the invention is used for a rotor magnet of an electric motor, it can be easily press fit into the motor. Motors provided with such a resin bound magnet are very light, exhibit excellent magnetic characteristics, and yet, can be produced at reduced manufacturing cost.

Additionally, since the rubber modified epoxy resin is minimally or not affected by the residual organic solvent, such as, acetone, it does not need to be subjected to rigorous control of the residual organic solvent nor a vacuum drying process, and exhibits improved workability after compression molding.

What is claimed is:

1. A resin bound magnet comprising a homogenous mixture of a powdered magnetic material and from 2 to 4 weight percent based on the weight of the magnetic material of a cured, rubber-modified epoxy resin wherein the rubber component is about 5 to 30 weight percent of a butadiene or nitrile rubber, based on the weight of the resin.

2. The resin bound magnet of claim 1 wherein the amount of rubber in the resin is about 20% by weight.

3. The resin bound magnet of claim 1 wherein the epoxy resin is an epi-bis type of epoxy resin obtained by the condensation of epichlorhydrin and bis-phenol A.

4. The resin bound magnet of claim 1 wherein the powdered magnetic material comprises a rare earth element iron and boron compound.

5. The resin bound magnet of claim 1 wherein the powdered magnetic material comprises a compound having the formula:

$$Nd_x(FE_{1-y}B_y)_{1-x'}$$

where $X = 0.14$ to $0.40$ and $Y = 0.05$ to $0.2$.

6. The resin bound magnet of claim 1 wherein the powdered magnetic material comprises a rare earth element and cobalt.

7. The resin bound magnet of claim 1 wherein the powdered magnetic material comprises from about 65 to 82 atom percent iron, from about 4 to 24 atom percent boron, and from about 12 to 20 atom percent of a rare earth element.

8. The resin bound magnet of claim 1 wherein the powdered magnetic material has been treated with a triazine compound to make it corrosion resistant.

9. The resin bound magnet of claim 1 in the form of a rotor magnet.

10. In an electric motor having a rotor magnet therein, the improvement which comprises said magnet being the rotor magnet of claim 9.

* * * * *